United States Patent [19]

Pond et al.

[11] 3,917,710

[45] Nov. 4, 1975

[54] PREPARATION OF PHYTONE VIA THE ADDITION OF DIMETHYLKETENE TO 4,8-DIMETHYL-12-OXOTRIDECANAL

[75] Inventors: David M. Pond; John G. Thweatt, both of Kingsport, Tenn.

[73] Assignee: Eastman Kodak Company, Rochester, N.Y.

[22] Filed: May 23, 1974

[21] Appl. No.: 472,792

[52] U.S. Cl. .......................... 260/593 R; 260/343.9
[51] Int. Cl.² ........................................ C07C 45/00
[58] Field of Search ............................... 260/593 R

[56] References Cited
UNITED STATES PATENTS

| | | | |
|---|---|---|---|
| 2,272,122 | 2/1942 | Lee | 260/593 R |
| 2,356,459 | 8/1944 | Kung | 260/343.9 |
| 2,422,679 | 6/1947 | Hall et al. | 260/593 R |
| 2,658,911 | 11/1953 | Kimel | 260/593 R |

*Primary Examiner*—James O. Thomas, Jr.
*Assistant Examiner*—James H. Reamer
*Attorney, Agent, or Firm*—Elliott Stern; Daniel B. Reece, III

[57] ABSTRACT

Phytone is prepared from 4,8-dimethyl-12-oxotridecanal by conversion thereof into a dimethylketene-β-lactone adduct, thermal decarboxylation of the adduct into 6,10,14-trimethyl-13-pentadecen-2-one and subsequent catalytic hydrogenation into phytone, a valuable intermediate in the synthesis of Vitamin E.

2 Claims, No Drawings

PREPARATION OF PHYTONE VIA THE ADDITION OF DIMETHYLKETENE TO 4,8-DIMETHYL-12-OXOTRIDECANAL

This invention relates to a novel process for preparing phytone, a valuable intermediate in the synthesis of Vitamin E.

A number of processes are already known for the synthetic preparation of phytone, see for example, U.S. Pat. No. 3,676,499 and H. Pommer, "*BASF*" *Review*, pages 184–191 (1970) and P. Ichikawa and T. Kato, *Bulletin of the Chemical Society of Japan*, Vol. 41, 1232–1236 (1968). These prior art processsses have disadvantages in that they start with expensive and rare materials, require a great number of operating steps, give poor yields or suffer from two or more of these defects.

The object of this invention is to remedy these defects by providing an easy, novel process which is useful in the preparation of phytone, a ketone having the emperical formula $C_{18}H_{36}O$.

It has been found that 6,10,14-trimethylpentadecan-2-one (phytone) can be prepared from 4,8-dimethyl-12-oxotridecanal in two steps via the synthetic route set forth below.

dition being effected at a temperature of from about 50°C. to about 100°C. in an inert atmosphere, in a polar solvent and in the presence of a catalyst selected from boron trifluoride etherate and zinc chloride;

B. thermal decarboxylation of the dimethylketene β-lactone adduct converting it into 6,10,14-trimethyl-13-pentadecen-2-one; and C. catalytic hydrogenation of the 6,10,14-trimethyl-13-pentadecen-2-one into phytone.

Any polar, non-nucleophilic solvent may be used in Step A. Examples of the polar solvents which may be utilized in Step A are the aliphatic esters such as isopropyl acetate, ethyl acetate, methyl acetate, isobutyl acetate, etc., the aliphatic ethers such as diethyl ether, dioxane, tetrahydrofuran and the like. Other polar solvents which may be used are acetonitrile and the chlorinated hydrocarbons such as chloroform, methylene chloride, dichloroethylene, etc., the aliphatic esters being the preferred solvents. Dimethylketene is known and may be prepared according to the method taught in H. Staudinger and H. W. Klever, *Chem. Ber.*, 39, 968 (1906) or E. Wedekind and W. Weisswange, *Chem. Ber.*, 39, 1631 (1906). The preferred cycloaddition

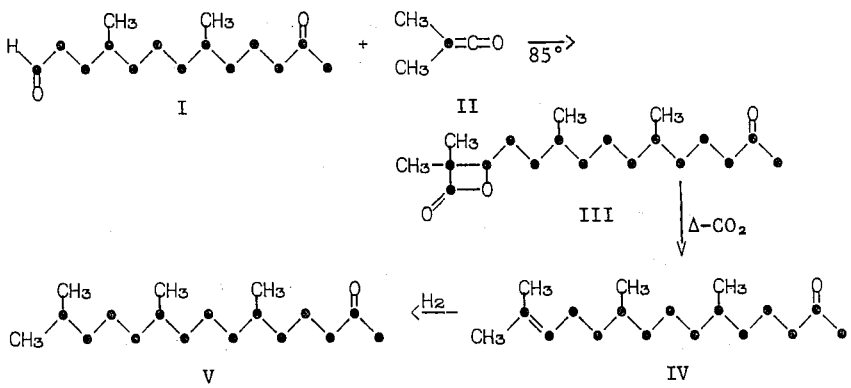

The starting material (I) 4,8-dimethyl-12-oxotridecanal in the novel process of this invention may be prepared in two simple steps from 1,5,9-trimethyl-1,5,9-cyclododecatriene (See U.S. Pat. No. 3,429,940). For example, 1,5,9-trimethyl-1,5,9-cyclododecatriene, 2-butanol, 2-butanone and Raney nickel may be heated at 200° for 12 hours in an autoclave under about 350 psi. of nitrogen. The catalyst may then be removed by filtration. Distillation of the product provides 1,5,9-trimethylcyclododecene. The 1,5,9-trimethylcyclododecane thus formed may then be added to a cooled solution containing methylene chloride and an alcohol such as isopropanol, treated with 3% ozone in an oxygen stream for about 3 hours, and subsequently treated with zinc dust in aqueous acetic acid. The layers may then be separated and the organic phase washed with dilute base and dried. Distillation gives the starting material in this novel process, 4,8-dimethyl-12-oxotridecanal.

Phytone may then be prepared as follows:

A. cycloaddition of dimethylketene to 4,8-dimethyl-12-oxotridecanal at the aldehyde function to form the dimethylketene β-lactone adduct, the cycloadcatalyst used in this step is boron trifluoride etherate having the formula: $BF_3 \cdot Et_2O$. The thermal decarboxylation may be carried out in the manner known in the art. Preferably this step will be carried out at temperatures of above 150°C. As used herein, the dimethyl-β-lactone adduct refers to compound III in the above synthetic scheme, 3,3-dimethyl-4-(3,7-dimethyl-11-oxododecyl) oxetan-2-one. The third step in the process of this invention, e.g., the catalytic hydrogenation of the product prepared Step B into phytone may be carried out in a manner well known in the art. Any of the known hydrogenation catalysts may be used to reduce the double bond moiety to give phytone. Examples of such catalysts are palladium-on-charcoal, Raney nickel, platinum oxide, etc.

The following examples further illustrate the invention.

EXAMPLE 1 — Preparation of 4,8-Dimethyl-12-oxotridecanal

A solution containing 40.88 grams (0.2 mole) of 1,5,9-trimethyl-1,5,9-cyclododecatriene (cyclic isoprene trimer) prepared according to U.S. Pat. No. 3,429,940 (1969), 32.03. (0.43 mole) of 2-butanol, 30 ml. of 2-butanone, and 2.0 g. of Raney nickel catalysts (slurried into 2-butanol) was heated at 200°C. in a rocking autoclave under nitrogen pressure (350 psi.) for 12 hours. The catalyst was removed by filtration and distillation gave 38.5 g. (91%) of a colorless liquid (b.p. 103°–105°C. at 0.9 torr). Field ionization mass spectroscopy indicated that the material contained 84% 1,5,9-trimethylcyclododecene and its nmr and ir spectra were consistent with the proposed structure.

Ozone (0.03 mole of $O_3$/hr. in an oxygen stream) was passed (3.1 hr.) through a solution which contained 21.0 g. (0.11 mole) of 1,5,9-trimethylcyclododecene in methylene chloride (50 ml.) and methanol (200 ml.) at −10°C. The solution was then transferred to a large flask and mixed with 100 ml. glacial acetic acid and 200 ml. water. With stirring, 6.6 g. (0.11 mole) of powdered zinc was added in small portions (exothermic reaction) over 0.5 hour. The layers were separated and the aqueous portion was washed with methylene chloride (100 ml.). The organic phases were combined, thoroughly washed with 5% $NaHCO_3$, washed with water, dried over magnesium sulphate and concentrated at reduced pressure. Distillation gave 17.40 g. (72.8%) of a colorless liquid (boiling range 110° to 150°C. at 0.7 torr.). Gas-liquid chromatography analysis confirmed that the distillate contained about 90% 4,8-dimethyl-12-oxotridecanal.

EXAMPLE 2 — Preparation of Dimethylketene
β-Lactone Adduct
[3,3-Dimethyl-
4-(3,7-dimethyl-11-oxododecyl)oxetan-2-one]

Dimethylketene (6.0 ml.) 0.07 mole was added under the surface to a solution containing 12.0 g. (0.05 mole) of 4,8-dimethyl-12-oxotridecanal and 15 drops of boron trifluoride etherate ($BF_3.Et_2O$ and 125 ml. isopropyl acetate held at 85°C.). The yellow color of the dimethylketene disappeared immediately on addition. After stirring an additional 1 hour the reaction mixture was mixed with 100 ml. of water and the layers were separated giving the dimethylketene β-lactone adduct in the organic layer.

EXAMPLE 3 — Preparation of
6,10,14-Trimethyl-13-pentadecene-2-one

The adduct prepared in Example 2 was transferred to a 300 ml. autoclave which was subsequently flushed with nitrogen, evacuated to 20 torr. and heated at 150° for 2 hours. The autoclave was opened and the ir spectrum of the solution indicated no β-lactone adduct remained. The reaction mixture was dried ($MgSO_4$) and distilled under reduced pressure to give an 82% yield of 6,10,14-trimethyl-13-pentadecene-2-one.

EXAMPLE 4 — Preparation of Phytone
(6,10,14-trimethylpentadecan-2-one)

A solution containing 1.10 g. (0.0038 mole of the 6,10,14-trimethyl-13-pentadecene-2-one prepared in the previous example and 0.10 g. of 5% palladium on charcoal and 50 ml. of ethyl acetate was stirred under a hydrogen atmosphere (40 psi. $H_2$ at 60°C.) for 6 hours. Separation of the catalyst and subsequent distillation gave 1.01 g. (91%) of 6,10,14-trimethylpentadecane-2-one. (b.p. 105°–108°C. at 0.2 torr).

While the particular embodiments of the invention have been described for purpose of illustration it should be understood that various modifications and adaptions thereof may be made within the spirit of the invention as set forth in the appended claims.

We claim:

1. Process for preparing phytone comprising the following series of reactions:
   A. cycloaddition of dimethylketene to 4,8-dimethyl-12-oxotridecanal at the aldehyde function to form the dimethylketene β-lactone adduct, said cycloaddition being effected at a temperature of from about 50°C. to about 100°C. in an inert atmosphere, in a polar non-nucleophilic solvent and in the presence of a catalyst selected from the group consisting of boron trifluoride ethereate and zinc chloride;
   B. thermal decarboxylation of the dimethylketene β-lactone adduct at a temperature of above 150°C. thereby converting it into 6,10,14-trimethyl-13-pentadecen-2-one; and
   C. catalytic hydrogenation of the 6,10,14-trimethyl-13-pentadecen-2-one into phytone said catalyst being selected from the group consisting of palladium on charcoal, Raney nickel or platinum oxide.

2. Process of claim 1 wherein the polar solvent of Step (A) is an aliphatic ester.

* * * * *